INVENTOR.
Takeji Okano
ATTORNEY

INVENTOR
Takeji Okano
BY
ATTORNEY

INVENTOR.
Takeji Okano

United States Patent Office
3,359,813
Patented Dec. 26, 1967

3,359,813
NON-STEP SPEED VARYING MECHANISM BY MEANS OF A COMBINATION OF TWO ECCENTRICS
Takeji Okano, 1 1-chome, Kasugacho, Bunkyoku, Toyko, Japan
Filed Sept. 14, 1964, Ser. No. 396,242
Claims priority, application Japan, Sept. 17, 1963, 38/49,912
4 Claims. (Cl. 74—117)

This invention relates to a non-step speed varying mechanism characterized by the fact that there are provided two eccentrics overlapped on each other but pivotable in eccentric condition on the shaft of said eccentrics between a driving shaft connected to a motor and a driven shaft so that the linear velocity of the jointing point of transmission power can be converted, by means of adjustment of the variable eccentricity of said eccentric pair, to a speed of rotation.

With reference to the accompanying drawings, the construction and action of the mechanism of the present invention will be explained in detail hereinafter.

Figure 1:
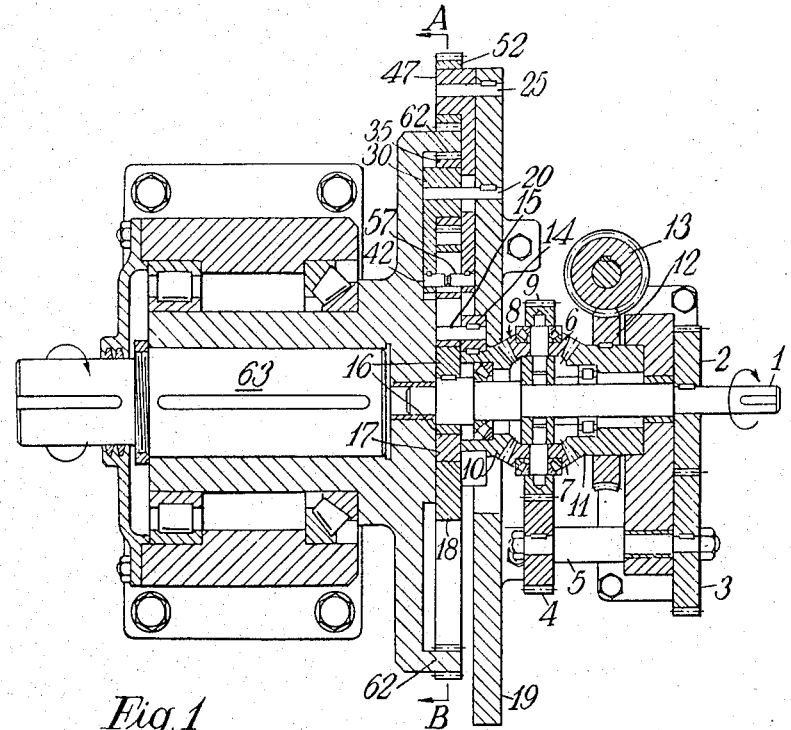
Figure 2:
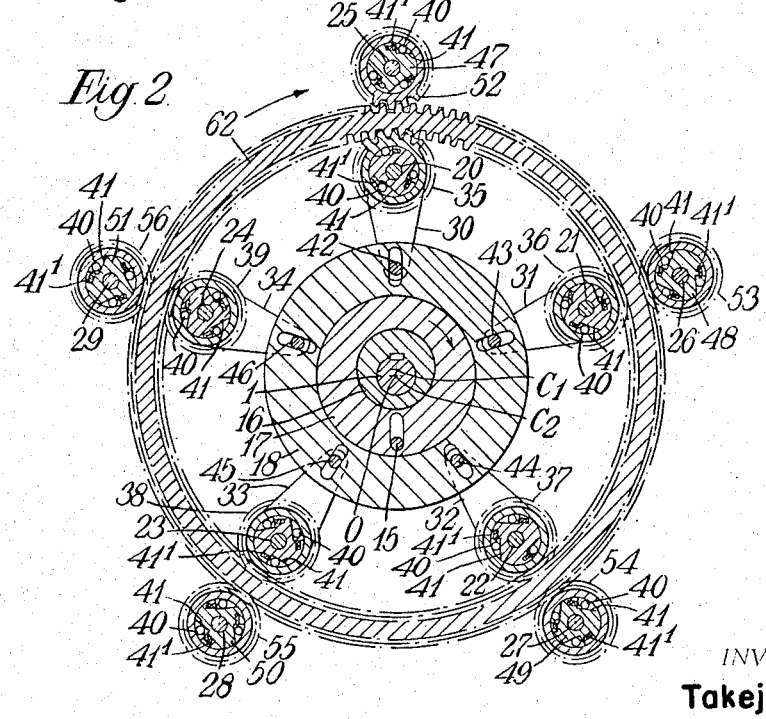
Figure 1A:
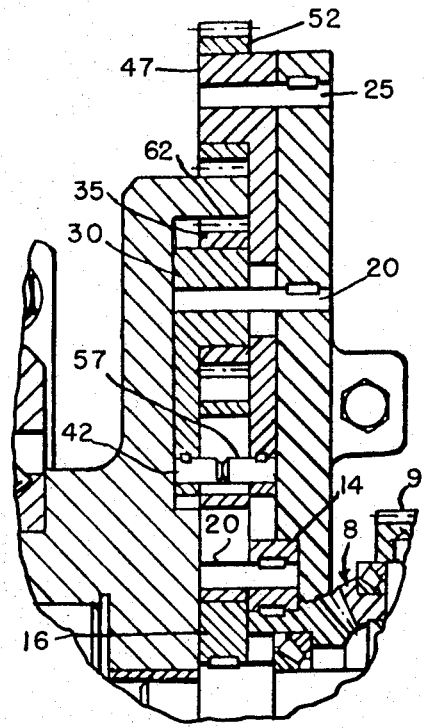
Figure 2A:
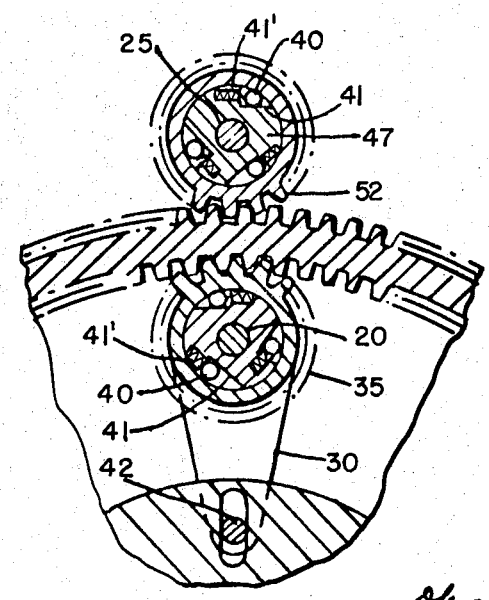
Figure 3:
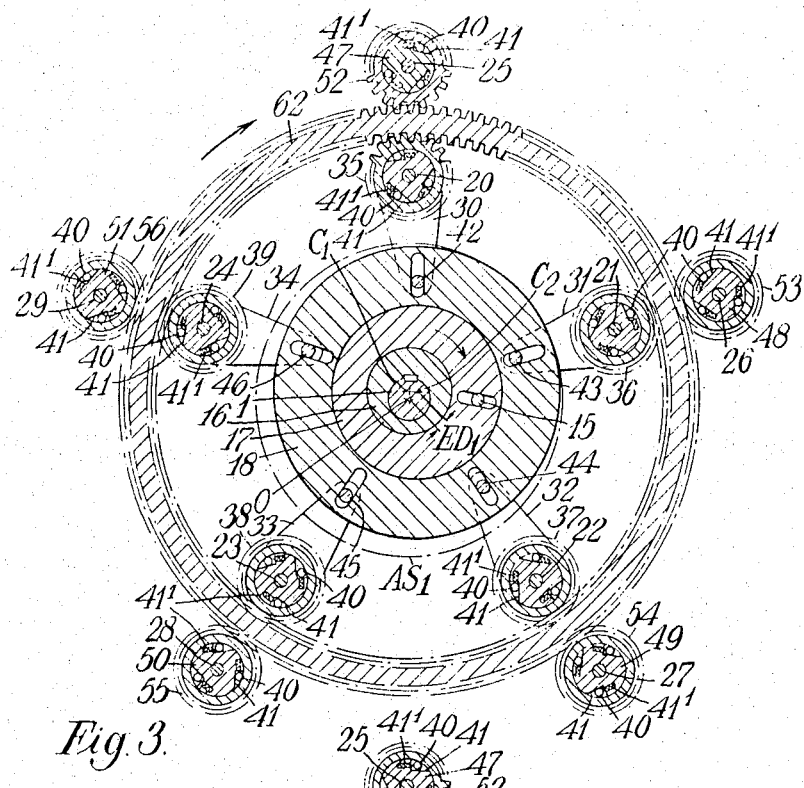
Figure 4:
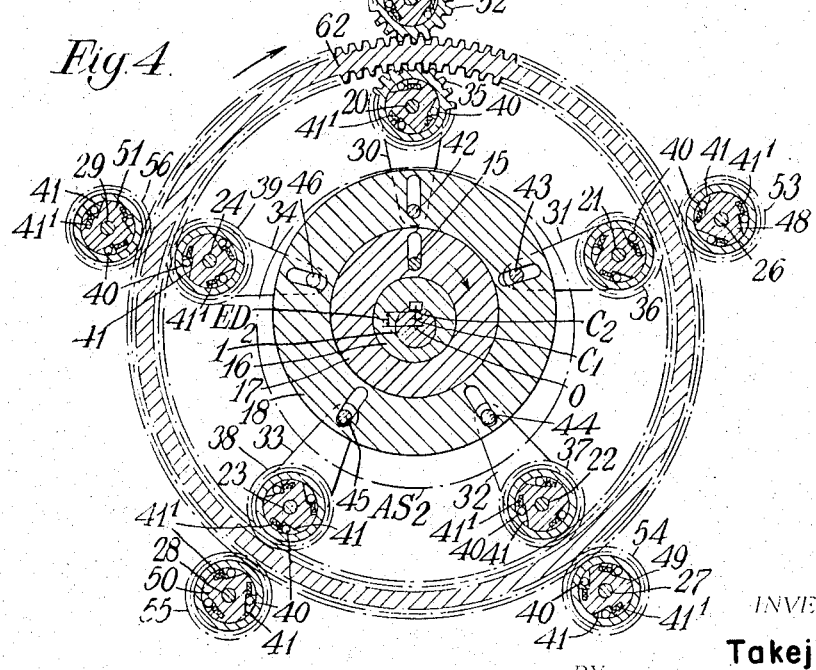

FIG. 1 is a plan view in section of a non-step speed varying mechanism by means of combination of two eccentrics according to the present invention. FIG. 1a is an enlarged view of FIG. 1 along the line A–B. FIG. 2 is a sectional view along the line A–B of the arrangement of two eccentrics as the principal members of the present invention, illustrating a condition of the smallest variable speed ratio. FIG. 2a is an enlarged view of a portion of FIG. 2. FIGS. 3 and 4 are views to show variable conditions in arrangement of two eccentrics with gradually increased variable speed ratios, taken along the line A–B of FIG. 1. In FIG. 1, an eccentric 16 and a gear 2 are fixed to a driving shaft connected to a motor, said gear 2 meshing with a gear 3. Said gear 3 and a gear 4 are fixed to an intermediate shaft 5. Said gear 4 meshes with a gear 9 fixed to a small bevel gear casing 8 having small bevel gears 6 and 7 freely rotatably mounted thereon. While meshing with said small bevel gears 6 and 7, bevel gears 10 and 11 are freely rotatably mounted on said driving shaft, confronting each other.

A wormwheel 12 is fixed to said bevel gear 11 and a wormgear 13 is arranged to mesh with said wormwheel. A bracket 14 is fixed to said bevel gear 10 and a pin 15 is implanted in said bracket. The pin 15 is put into a groove of an eccentric 17 which is inserted onto an eccentric 16 in such a manner that the former eccentric 17 can rotate around the latter as its shaft. A swing plate 18 is mounted on said eccentric 17 in such a manner that it can rotate around said eccentric 17 as its shaft. Pins 20, 21, 22, 23 and 24 are implanted in the inner side of a fixed plate 19 while pins 25, 26, 27, 28 and 29 are implanted on the outer side thereof.

The pins in the inner side are provided with respective arms 30, 31, 32, 33 and 34 axially mounted thereon and the shafts of said arms 30, 31, 32, 33 and 34 are equipped with respective pinions 35, 36, 37, 38 and 39 also axially mounted thereon. These pinions are equipped with a wedge mechanism consisting of a clutch member, e.g., a roller 40, a slope surface 41 and a spring 41′ in such a manner that said clutch member can cause each pinion to transmit rotatable power in one direction only, i.e., in the same direction as that of rotation of the driving shaft as illustrated in the drawing. Moreover, pins 42, 43, 44, 45 and 46 are implanted in said arms 30, 31, 32, 33 and 34 respectively, each arm pin being inserted in a groove of said swing plate 18. Likewise, arms 47, 48, 49, 50 and 51 are respectively axially mounted on the outer pins 25, 26, 27, 28, and 29 and pinions 52, 53, 54, 55 and 56 are also axially mounted on the shaft portions thereof respectively. These pinions are also provided with a clutch member 40–41 similar to the aforesaid one in order to cause themselves to transmit rotatable power in one direction, i.e., opposite to that of rotation of the driving shaft in the embodiment as shown in the drawing. Also, arm pins 57 . . . are respectively implanted in said arms and inserted in the groove of said swing plate 18 as shown in FIG. 1, confronting said arm pins 42 . . . 46 in order.

The pinions 35, 36, 37, 38 and 39 are so designed as to mesh with the inner teeth of a gear 62 of the driven shaft while the pinions 52, 53, 54, 55 and 56 are caused to mesh with the outer teeth of the gear 62 which is fixed to the driven shaft 63. The inner pins 20, 21, 22, 23 and 24, arms 30, 31, 32, 33 and 34, and the pinions 35, 36, 37, 48 and 39 and arm pins 42, 43, 44, 45 and 46 are respectively identical in pitch, number of teeth and size respectively while the outer pins 25, 26, 27, 28 and 29, the arms 47, 48, 49, 50 and 51 and the pinions 52, 53, 54, 55, and 56 are also respectively identical in pitch, number of teeth and size respectively. Next, the action of the speed varying mechanism of the present invention will be explained in detail below.

As shown in FIG. 1, following the rotation of the driving shaft 1, the eccentric 16 is caused to pivot so that the gears 2, 3 and 4 may also rotate for rotating the gear 9 and the small bevel gear casing 8 which is caused to mesh with the bevel gears 10 and 11 on one hand and causes the bevel gears 6 and 7 to rotate around the driving shaft on the other hand. In this case, the bevel gear 11 is shown to keep in standstill condition by means of the wormwheel 12 and the worm 13 so that the bevel gear 10 can rotate in the same direction as that of rotation of the driving shaft. Since the gears 2 and 3 and the bevel gears 10 and 11 have the same number of teeth respectively and the gear 9 is twice as large as the gear 4 in size, the former gear 9 is destined to rotate at one half of r.p.m. of the driving shaft in the same direction as the latter. When the bevel gear 10 begins to rotate at an r.p.m. twice that of gear 9, the bracket 14 fixed thereto will also rotate and then the eccentric 17 does the same by means of the pin 15. Since the eccentrics 16 and 17 are caused to rotate at the same r.p.m. in the same direction, they are understood to keep rotating unchanged in relative position at ordinary times.

In other words, the eccentricity of the eccentric 16 and that of the eccentric 17 are combined and adjusted together, resulting in a special eccentricity ratio which can cause the swing plate 18 to move accordingly. The circumferential linear velocity of this swinging movement of plate 18 is transmitted to the pins 42, 43, 44, 45 and 46 and also the outer arm pins 57 . . . to cause the movement of the inner arms 30, 31, 32, 33, and 34 and the outer arms 47, 48, 49, 50 and 51 respectively and then, cause the rotation of the inner pinions 35, 36, 37, 38 and 39 and the outer pinions 52, 53, 54, 55 and 56 respectively so that the rotating speed of these pinions can be transmitted to the gear 62 of the driven shaft for rotation of the same. There is provided a clutch member on the inner arms to cause the rotation of each of the pinions only in the same direction as the driving shaft and likewise, another clutch member is also provided on the outer arms to cause each of the pinions in a direction opposite to that of rotation of the driving shaft and thus the driven shaft is caused to rotate in the same direction as the driving shaft. Moreover, the wormwheel 12 is fixed to the bevel gear 11 and the worm 13 is so provided as to mesh therewith so that when they are caused to rotate, the bevel gear 11 is caused to rotate until the small bevel gears 6 and 7, the bevel gear 10 and the bracket 14 can rotate in turn and then the eccentric 17 is caused to rotate by means of the pin 15 and finally, the relative position of the eccentrics 16 and 17 is shifted as shown in FIGS. 2, 3 and 4. As is self-explanatory from the illustrated embodiment, the center of the swing plate 18, namely, the center $C_2$ of the eccentric 17 overlapped on the center O of the central shaft (FIG. 2) is gradually shifted in such a manner that said center $C_2$ can pivot around the center $C_1$ of the cam 16, be adjusted and rearranged in eccentric condition thereby permitting non-step speed variation in rotation ratio. Thus, as the overlapped condition of said center $C_2$ on the center O of the central shaft (FIG. 2) is changed by extending from a distance $ED_1$ (FIG. 3) to another distance $ED_2$ (FIG. 4), the locus circles $AS_1$ and $AS_2$ along which the swing plate 18 moves become gradually larger so that its circumferential linear velocity also becomes larger. This change of linear velocity is converted to a change in rotating speed, according to the present invention and this kind of utilization makes the essence thereof. When the center of the swing plate 18, namely, the center $C_2$ of the eccentric 17 is coincident with the center O of the central shaft (FIG. 2), the eccentricity of the swing plate 18 is zero so that it cannot swing but keeps standstill to cause no movement of the arms and hence, in spite of the rotation of the driving shaft 1, the driven shaft does not rotate. When the worm 13 and the wormwheel 12 are caused to rotate and the eccentric 17 is also caused to move a certain angle, the center of the swing plate 18, namely, the center of the cam 17 will be shifted as far as the distance $ED_1$ from the center O of the central shaft so that the swing plate 18 can also swing along the locus circle $AS_1$ and hence the movement of its circumference acts on the arm pins or arms until the relative pinions can be moved to cause the rotation of the gear 62 of the driven shaft, thus permitting the driven shaft 63 to rotate at a gradually increasing speed from its standstill condition. Consequently, the worm 13 and the wormwheel 12 are also caused to rotate as shown in FIG. 4. When the distance $EO_2$ between the center of the swing plate 18, namely, the center $C_2$ of the eccentric 17 and the center O of the central shaft becomes a maximum, the swinging locus $AS_2$ of the swing plate 18 also becomes a maximum and then the r.p.m. of the driven shaft 63 also reaches a maximum.

In conclusion, according to the present invention, it is made possible to vary the rotating speed of the driven shaft 63 in a non-step manner, starting from zero shown in FIG. 2 under conditions of the center of the swing plate, namely, the center $C_2$ of the cam 17 coinciding with the center O of the central shaft, up to a maximum of r.p.m. through the intermediary arms, pinions and the gear of the driven shaft. The non-step speed varying mechanism of the present invention consists in the eccentric combination of two eccentrics and the utilization of difference in eccentricity between the center of the swing plate and that of the central shaft so that such difference can be changed in a non-step manner within its adjustable range thereby permitting the driven shaft to rotate at any desired r.p.m.

I claim:

1. Non-step continuously adjustable speed varying mechanism comprising: a drive shaft and a driven shaft; a small eccentric fixedly and eccentrically mounted on the drive shaft; a large eccentric rotatably and eccentrically mounted on the small eccentric; a swing plate rotatably mounted flushly on the outer surface of the large eccentric; means to rotate the large eccentric at the r.p.m. of the drive shaft; means to adjust the combined eccentricity of the small and large eccentrics about the drive shaft; and means to couple tangential swinging movement of the swing plate to the driven shaft to effect rotation thereof.

2. Non-step continuously adjustable speed varying mechanism as claimed in claim 1, said swing plate having a plurality of slots, each slot lying substantially on an extension of a radius of the outer surface of the large eccentric; said means to couple comprising a plurality of assemblies, there being at least one assembly associated with each of said slots, each of said assemblies comprising: an arm having at one end a pin fitting slidably into a slot of said swing plate; a pivoting means enabling swinging movement of said arm about a point situated away from said pin and fixed relative to the drive shaft; and means to convert swinging movement of said arm into rotation of said driven shaft in one rotational direction only.

3. Non-step speed varying mechanism as claimed in claim 2, said means to convert including a common gear (62) common to all assemblies and coupled to said driven shaft; said means to convert further comprising in each assembly a pinion gear meshed with said common gear and concentric with the point about which said arm swings and a one-rotational-direction clutch means between said arm and said pinion gear to transmit swinging movement of said arm into rotation of said common gear in one rotational direction only.

4. Non-step continuously adjustable speed varying mechanism as claimed in claim 3, said common gear being a ring gear with internal and external teeth; said mechanism having said assemblies in pairs, said pin of each assembly of a pair being one and the same pin fitting in one of said slots; the external teeth of said ring gear meshing with the pinion gear of one assembly of each pair and the internal teeth of said ring gear meshing with the pinion gear of the other assembly of each pair.

References Cited

FOREIGN PATENTS 610,560  9/1926  France.
386,138  1/1933  Great Britain.

FRED C. MATTERN, JR., *Primary Examiner.*

W. S. RATLIFF, *Assistant Examiner.*